(12) United States Patent
Tomko et al.

(10) Patent No.: US 8,515,729 B2
(45) Date of Patent: Aug. 20, 2013

(54) USER TRANSLATED SITES AFTER PROVISIONING

(75) Inventors: Tomasz Grzegorz Tomko, Seattle, WA (US); Jay R. Rathi, Woodinville, WA (US); Almon C. Dao, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 1032 days.

(21) Appl. No.: 12/059,429

(22) Filed: Mar. 31, 2008

(65) Prior Publication Data
US 2009/0248393 A1    Oct. 1, 2009

(51) Int. Cl.
*G06F 17/28* (2006.01)

(52) U.S. Cl.
USPC ............ 704/2; 704/3; 704/4; 704/6; 704/7; 704/8; 715/264

(58) Field of Classification Search
USPC ........................ 704/2–8; 715/264
See application file for complete search history.

(56) References Cited

U.S. PATENT DOCUMENTS

| | | | | |
|---|---|---|---|---|
| 5,490,061 A * | 2/1996 | Tolin et al. | | 704/2 |
| 5,944,790 A | 8/1999 | Levy | | 709/218 |
| 6,470,306 B1 * | 10/2002 | Pringle et al. | | 704/3 |
| 6,623,529 B1 | 9/2003 | Lakritz | | 715/536 |
| 6,735,759 B1 * | 5/2004 | Yamamoto et al. | | 717/136 |
| 6,839,742 B1 | 1/2005 | Dyer et al. | | 709/217 |
| 6,964,014 B1 | 11/2005 | Parish | | 715/513 |
| 7,016,977 B1 | 3/2006 | Dunsmoir et al. | | 709/246 |
| 7,139,696 B2 | 11/2006 | Tokieda et al. | | 704/8 |
| 7,149,964 B1 | 12/2006 | Cottrille et al. | | 715/513 |
| 7,234,110 B2 | 6/2007 | Sumitomo | | 715/513 |
| 7,409,333 B2 * | 8/2008 | Wilkinson et al. | | 704/2 |
| 7,464,408 B1 * | 12/2008 | Shah et al. | | 726/22 |
| 7,543,189 B2 * | 6/2009 | Fichter et al. | | 714/38.14 |
| 7,913,228 B2 * | 3/2011 | Ericsson et al. | | 717/123 |
| 2002/0055868 A1 * | 5/2002 | Dusevic et al. | | 705/9 |
| 2004/0044518 A1 | 3/2004 | Reed, Jr. et al. | | 704/8 |
| 2005/0137873 A1 | 6/2005 | Liu | | 704/270.1 |

(Continued)

FOREIGN PATENT DOCUMENTS

CN    101030198    9/2007
KR    10-0450881    10/2004

OTHER PUBLICATIONS

Cunningham; "*Multilingual Unicode Web Page Development*"; http://home.vicnet.net.au/~andrewc/papers/cn99.html; Community Networking Confernce 1999: Engaging Regionalism; Sep. 29-Oct. 1, 1999; pp. 1-12.

(Continued)

*Primary Examiner* — Lamont Spooner
(74) *Attorney, Agent, or Firm* — Merchant & Gould

(57) ABSTRACT

The display language of a site may be changed to another alternate language by users of a site at any time. For example, a first user may access the same site in its default language (i.e. English) and a second user may access the site using their preferred language (i.e. French) even though the default language of the site is different from their preferred language. The language of the site may be changed from one language to another language at any time a user is accessing the site. Application content changes are identified by the site helping to ensure consistency between the default language and the alternate languages.

17 Claims, 4 Drawing Sheets

(56) References Cited

U.S. PATENT DOCUMENTS

| | | | |
|---|---|---|---|
| 2005/0171946 A1* | 8/2005 | Maim | 707/5 |
| 2005/0198573 A1 | 9/2005 | Ali et al. | 715/264 |
| 2005/0227218 A1* | 10/2005 | Mehta et al. | 434/350 |
| 2006/0116865 A1* | 6/2006 | Cheng et al. | 704/2 |
| 2006/0184544 A1* | 8/2006 | Harper | 707/10 |
| 2007/0219774 A1* | 9/2007 | Quirk et al. | 704/2 |
| 2007/0233456 A1* | 10/2007 | Kim | 704/2 |
| 2008/0010615 A1* | 1/2008 | Curtis et al. | 715/846 |
| 2008/0126944 A1* | 5/2008 | Curtis et al. | 715/733 |
| 2008/0127045 A1* | 5/2008 | Pratt et al. | 717/104 |
| 2008/0162112 A1* | 7/2008 | Andersen et al. | 704/2 |
| 2008/0162114 A1* | 7/2008 | Torres-Rocca et al. | 704/7 |
| 2008/0195377 A1* | 8/2008 | Kato et al. | 704/8 |
| 2008/0221867 A1* | 9/2008 | Schreiber | 704/8 |
| 2008/0244740 A1* | 10/2008 | Hicks et al. | 726/22 |
| 2009/0070094 A1* | 3/2009 | Best et al. | 704/2 |
| 2009/0112575 A1* | 4/2009 | Sakashita et al. | 704/8 |
| 2009/0182702 A1* | 7/2009 | Miller | 706/60 |
| 2009/0204385 A1* | 8/2009 | Cheng et al. | 704/2 |
| 2009/0326913 A1* | 12/2009 | Simard et al. | 704/2 |
| 2012/0260155 A1* | 10/2012 | Krieger et al. | 715/229 |

OTHER PUBLICATIONS

Ghanem; "*Developing Website for Users of Lamguages Other Than English*"; http://www.otal.umd.edu/uupractice/ non_english/; Apr. 2001; pp. 1-8.

Kok Yong; "*Multiple Language Support over the World Wide Web*"; http://www.isoc.org/isoc/whatis/conferences/inlet/96/proceedings/a5/a5_2.htm; pp. 1-10, 1996.

International Search Report mailed Sep. 21, 2009, in PCT/US2009/034646.

EP Supplemental Search Report mailed Mar. 23, 2011, in EP Appl. No. 09755303.6.

Office Action mailed Oct. 19, 2011, in MX Appl. No. MX/a/2010/010777, w/English Summary.

Office Action mailed Mar. 1, 2012, in CN Appl. No. 200980112494.X, w/English translation.

Office Action mailed Nov. 22, 2012, in CN Appl. No. 200980112494.X, w/English translation.

* cited by examiner

USER TRANSLATED SITES AFTER PROVISIONING

BACKGROUND

Businesses often create sites to allow collaboration of team members working on various projects. These sites provide the team members a collaborative place to share ideas and work on projects together. Using these sites, team members typically share information and documents, generate ideas, respond to other team member's ideas, and track the progress of the projects. While the team members may be more comfortable using their native languages, the sites are provisioned with a default language with which they use to communicate on the site.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The display language of a site may be changed to alternate languages by users of a site at any time. For example, a first user may access the site in its default language (i.e. English) and a second user may access the same site using their preferred language (i.e. French) even though the default language of the site is different from their preferred language. The language of the site may be changed from one language to another language at any time while a user is accessing the site. Application content changes are identified by the site helping to ensure consistency between the default language and the translations to the alternate languages.

DETAILED DESCRIPTION

Figure 1:
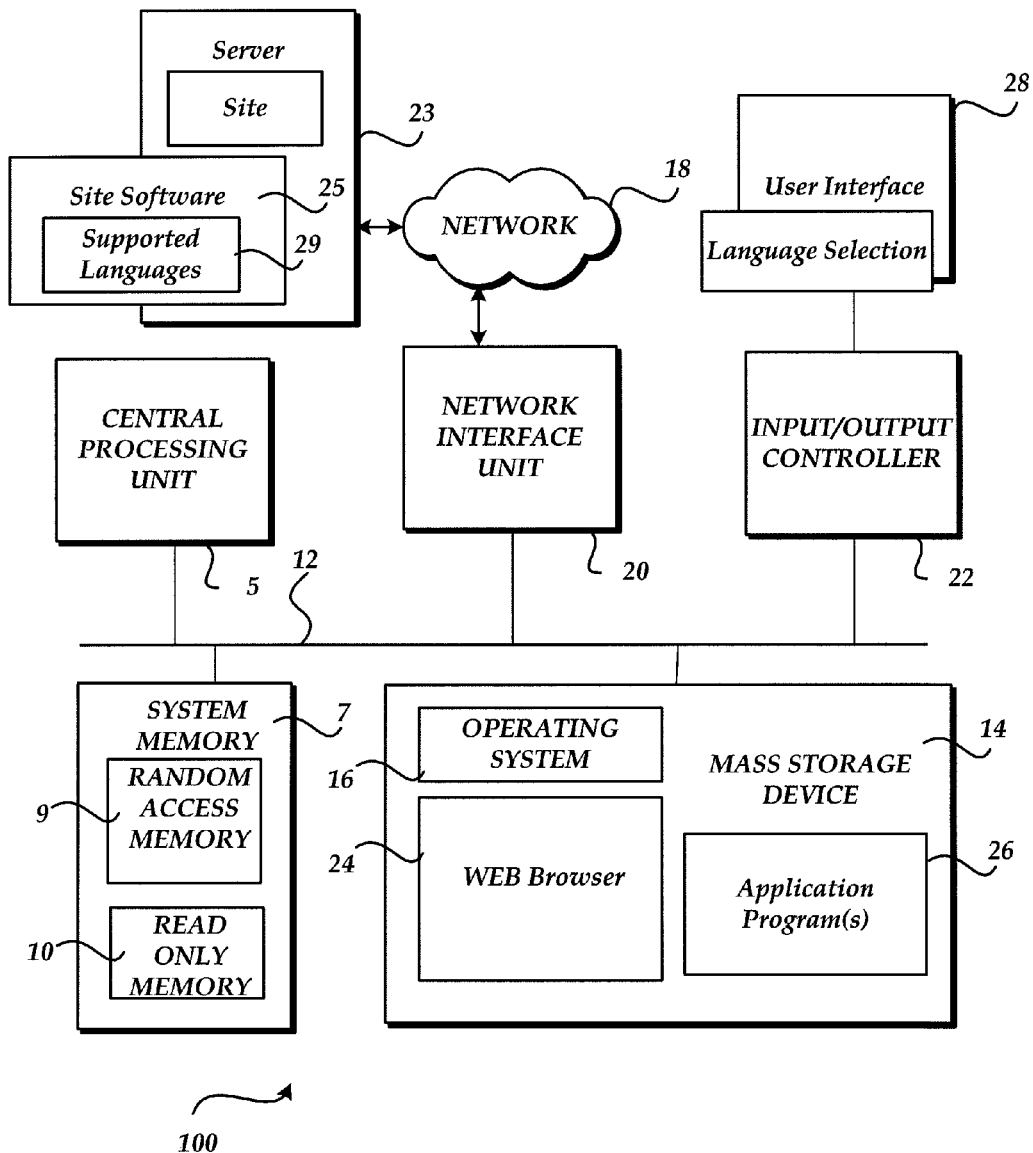
FIG. 1 illustrates an exemplary computing system.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. While computer 100 is generally illustrated as a client computing device, computer 100 may be configured as a client, a server, mobile device, or any other computing device that is used to provide and/or interact with a web site. Computer 100 includes a central processing unit 5 ("CPU"), a system memory 7, including a random access memory 9 ("RAM") and a read-only memory ("ROM") 10, and a system bus 12 that couples the memory to the CPU 5. A basic input/output system containing the basic routines that help to transfer information between elements within the computer, such as during startup, is stored in the ROM 10. The computer 100 further includes a mass storage device 14 for storing an operating system 16, application programs 24, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen that includes a user interface 28, a printer, or other type of output device. Computer 100 may also be coupled to data source(s) (not shown) through a network connection 18, and/or some other connection.

As mentioned briefly above, a number of program modules and data files may be stored in the mass storage device 14 and RAM 9 of the computer 100, including an operating system 16 suitable for controlling the operation of a networked personal computer, such as the WINDOWS VISTA® operating system from MICROSOFT CORPORATION of Redmond, Wash. The mass storage device 14 and RAM 9 may also store one or more program modules. In particular, the mass storage device 14 and the RAM 9 may store one or more application programs 26, such as a web browser application 24. For example, browser program 24 may be the MICROSOFT INTERNET EXPLORER® application.

Server 23 is configured to provide site services for computer 100. As illustrated, server 23 includes site software 25 that is configured to provide a site that is accessed through browser application 24 on client 100. According to one embodiment, the site software, such as MICROSOFT SHAREPOINT SERVICES® may be used to provide collaboration tools, document storage tools and workflow tools that are associated with a site. For example, a site may be created that provides users (team members) with ways to share documents; share calendar or event information; generate and discuss ideas about a project; and adding, assigning, and tracking tasks concerning a project. The site may be configured as an Internet Site, Extranet Site, and/or an Intranet site or any other site that is accessible to users. Site software 25 is configured to provide the same site to users using different supported languages 29. According to one embodiment, the supported languages 29 are provided in language packs that allow a user to view the site in different languages. When a language is selected by a user for the display of the site, the navigation and pages for that site are displayed to that user in the selected language. In this way, one user of the site may view the site using a first language, a second user may view the same site using a second language, a third user may view the same site using a third language, and the like.

User interface (UI) 28 is designed to provide a user with a visual way to view the site and to select a language of the site in which to view the site. For example, UI 28 may be used to select a language from one of the available supported languages in language packs 29. According to one embodiment, once a user selects a language to view the site that language will remain selected for that user until changed. In this way, different team members may view the site in their preferred language. The language of the site may be changed at any time. For example, a user may change the site from a default language to an alternate language and back to the default language during one visit to the site. UI 28 may also be used to make modifications/additions to the content of the site. Site software 25 includes tools to help maintain the consistency of the site's languages when changes are made in one language that may affect the other languages (see below).

Figure 2:
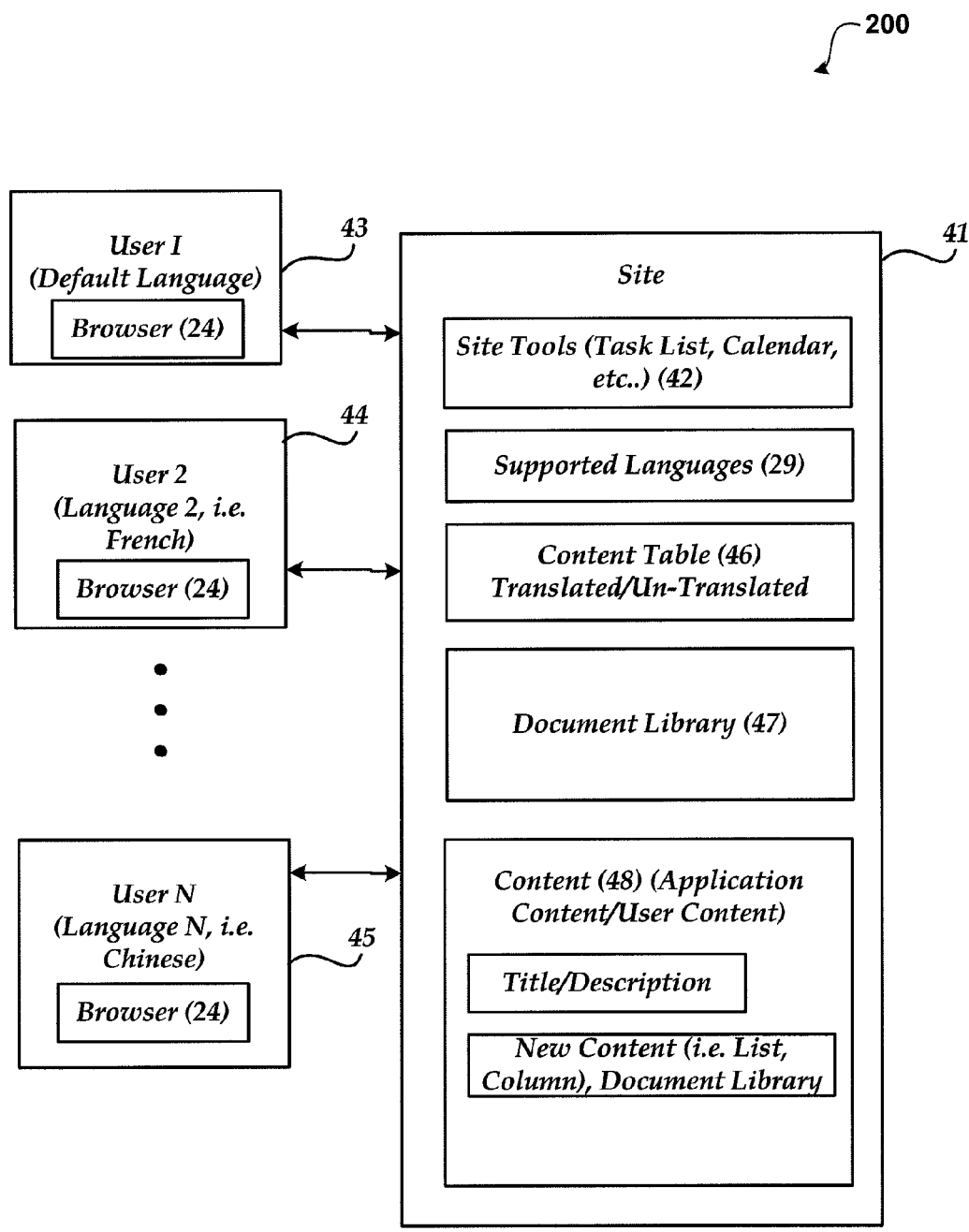
FIG. 2 shows a system for translating sites from a default language to alternate languages.

FIG. 2 shows a system for translating sites from a default language to alternate languages. As illustrated, system 200 includes site 41, supported languages 29, content table 46, document library 47, content 48, User 1 43, User 2 (44), User N (45) and browser 24.

For illustration purposes, and not intended to be limiting, an example of providing a display of the same site in different languages to different users will be described. Suppose that user 1 (43) and user 2 (44) both work at the same company, and routinely collaborate on projects and interact with one another. For a project, suppose that user 1 creates a site 41 that will be worked on by a group of users including User 1, User 2 through User N. User 1 initially provisions the default language of the site 41 to be English. Some of the users have a different preferred language as compared to the default language. User 1 could have initially provisioned the site using any of the supported languages 29. The language that is initially chosen for provisioning the site is considered the default language for the site and all of the other supported languages for the site are considered alternate languages. Generally, the language specified when a site is created controls the language used in the site itself. For example, if the site was provisioned in French, all of the toolbars, navigation bars, list and form pages, and so on, appear in French. If the site was created in Arabic, the text is in Arabic, and the default left-to-right orientation of the site is changed to right-to-left to properly display Arabic text.

Continuing with the example, User 1 uploads documents to the Documents Library 47, creates a number of tasks in the Task List, and sets up a recurring meeting with the users using the Team Site Calendar using site tools 42. User 1 performs these operations using the default language of English. User 2, however, would prefer to view site 41 in their native language of French. Since French is one of the supported languages 29 on this site he goes ahead and changes the language of the site to French using a user interface that is provided by the site in browser 24 of User 2's display. According to one embodiment, the language of the site may be automatically changed to another language based on a language setting. For example, the language selected may be based on the user's browser's settings, or some other setting that indicates a language preference. In the current example, once French is selected, the application content 48 for site 41 is now displayed in French. Application content includes, but is not limited to help items, menu bars, links, titles, descriptions and the like. Generally, application content is content that describes the user interface (UI) for the site. According to one embodiment, the application content is the strings that represent the UI controls, help items, titles and descriptions relating to the site. Content that is not translated after provisioning the site is considered user content. This user content may include items such as documents in document library, titles and properties of documents/list items, or other content that is loaded onto the site by a user. User content is displayed in the language in which it is uploaded. For example, the documents uploaded to the document library in the example would be displayed in the default language of English to User 2 even though the rest of the site is displayed in the alternate selected language of French.

Suppose now that User 1 decides to add a new Document Library to keep track of expense reports associated with the project. User 1 creates the new Document Library on the site using the UI. Since User 1 is working in the default language (English UI) the Title and Description of the Document Library are made in English. When User 1 adds the new content, the title and description strings entered for the new document library are automatically marked by the site as un-translated for the other supported alternate languages (in this case the title and the description strings in French are marked as un-translated) in content table 46. Each piece of application content 48 (e.g. column name, list title etc.) includes an identifier in content table 46 that indicates whether that piece of application content has been translated between the default language and a particular alternate language. This identifier is set and reset automatically by site 41 when a user adds or modifies application content in either the default or alternate languages.

A user may decide to add other new application content to the site at any time. For example, the user may add a new list or add a new column to an existing list. The user can make such an addition to the site using the default language or add the new application content in one of the alternate languages. When a user adds new application content in the default language the content in the alternate language(s) is added in the default language. In this case the application content for all alternate languages is marked as un-translated internally. When a user adds new application content in the alternate language, the content in the default language is also added. All other alternate languages will be missing translations and thus fallback to the strings just added in the default language. According to one embodiment, when a user attempts to add content using an alternate language a warning is displayed stating that the content should be added using the default language and then translated into the supported alternate languages.

Instead of adding content to site 41, a user may decide to modify the content 48 of a site. For example, the user may change the title or description of a list, the title or description of a site, the name or description of a column, and the like. The content may be modified using the default language or using one of the other supported alternate language(s). According to one embodiment, a modification of the content using the default language is treated as changing the content whereas a modification using one of the alternate languages is treated as translating the content. According to one embodiment, the modification is treated as a translation of the content since there is no easy way to determine the nature of the change.

A translation setting in site 41 determines how modifications to content using the default language are treated by the supported alternate languages. This translation setting may be predefined when the site is initially provisioned and/or changed at a later time through the user interface. Depending on the state of the translation setting, the alternate language content string is replaced by the new default language string or the alternate language application content string remains unchanged. In both of these cases the content for all alternate languages is internally marked as un-translated within content table 46. According to one embodiment, each independent string in the application content includes an identifier that indicates whether the string is translated or un-translated.

Marking the content as un-translated makes it easy for a user to locate the un-translated content such that translations may be provided for the modified content. According to one embodiment, the user may access all of the un-translated strings and provide a translation of the content in the supported alternate languages. This may be done in many different ways. For example, each supported language may have a separate file that is modified and then imported into the site or all of the strings for each of the languages may be included in a single file.

When a user modifies the content using one of the alternate languages, the content in the default language and any other alternate languages is unchanged. This type of change by a user is treated as a translation and thus is limited to the alternate language the user is working in. The default language values and the other alternate language values are not changed. When the change is made using one of the alternate languages, the modified content is marked as translated within the strings for the alternate language.

Returning to the example, when User 2 (using the alternate language French UI) navigates to the newly created Document Library created by User 1 he sees the Title and Description of the Document Library are in English. User 2 decides to translate the Title and Description right away by navigating to the List Settings page and changing the English string values for the Title and Description fields to French. The English strings for these fields which User 1 sees are not affected by User 2's change. Once User 2 makes these changes the strings User 2 modified are marked as translated indicating that the default language string(s) have been translated to this supported language.

In addition to translating the title and description strings, User 2 also wants to change the name of an existing column on the newly created Document Library. Again, because User 2 is viewing the site using the French UI he edits the column name and changes the French string value to a new French string value. Should User 2 want User 1 (or other users) to view the name change in other languages that string has to be translated for the other languages. One way to make these changes is for User 2 to change the language of the site from French to the default language of English and make the corresponding change in the English UI. The name of the column is now the same between the two languages. User 2 could also perform this operation for the other supported alternate languages.

While translations may be done one at a time, a user may also query the site using an Application Programming Interface (API), the UI, or access a file that includes the strings, to determine the changes made that require a translation. For example, suppose that User 1 completes a number of customizations over some period of time to the existing site using the default language (English). This could include the creation of new lists, additions of new columns, modification of list titles, modification of column names etc. Since these changes will cause the alternate languages to contain a mixture of the default language and the alternate language translations should be provided to make navigation in the alternate language easier. Rather than having User 2 manually select each change in the French UI and make the corresponding translations, any user can export the strings needing translation. Alternatively, a predefined user could have access to the strings needing translation. According to one embodiment, the un-translated strings are exported to an XML file. Alternatively, all of the strings could be exported to the file. According to one embodiment, the strings that need translating are identifiable since the strings are marked as un-translated. A user could then send the strings off to be localized for their language or make the translations themselves and import the changed file.

The user also is provided the option of importing all the strings associated with any modified or new application content for any of the alternate languages available on the site. This importing and exporting may be accomplished many different ways. For example, an Application Programming Interface (API) may be used and/or the UI of the site may be used. In this way, the functionality may be accessed programmatically and/or manually through a user interface.

Figure 3:
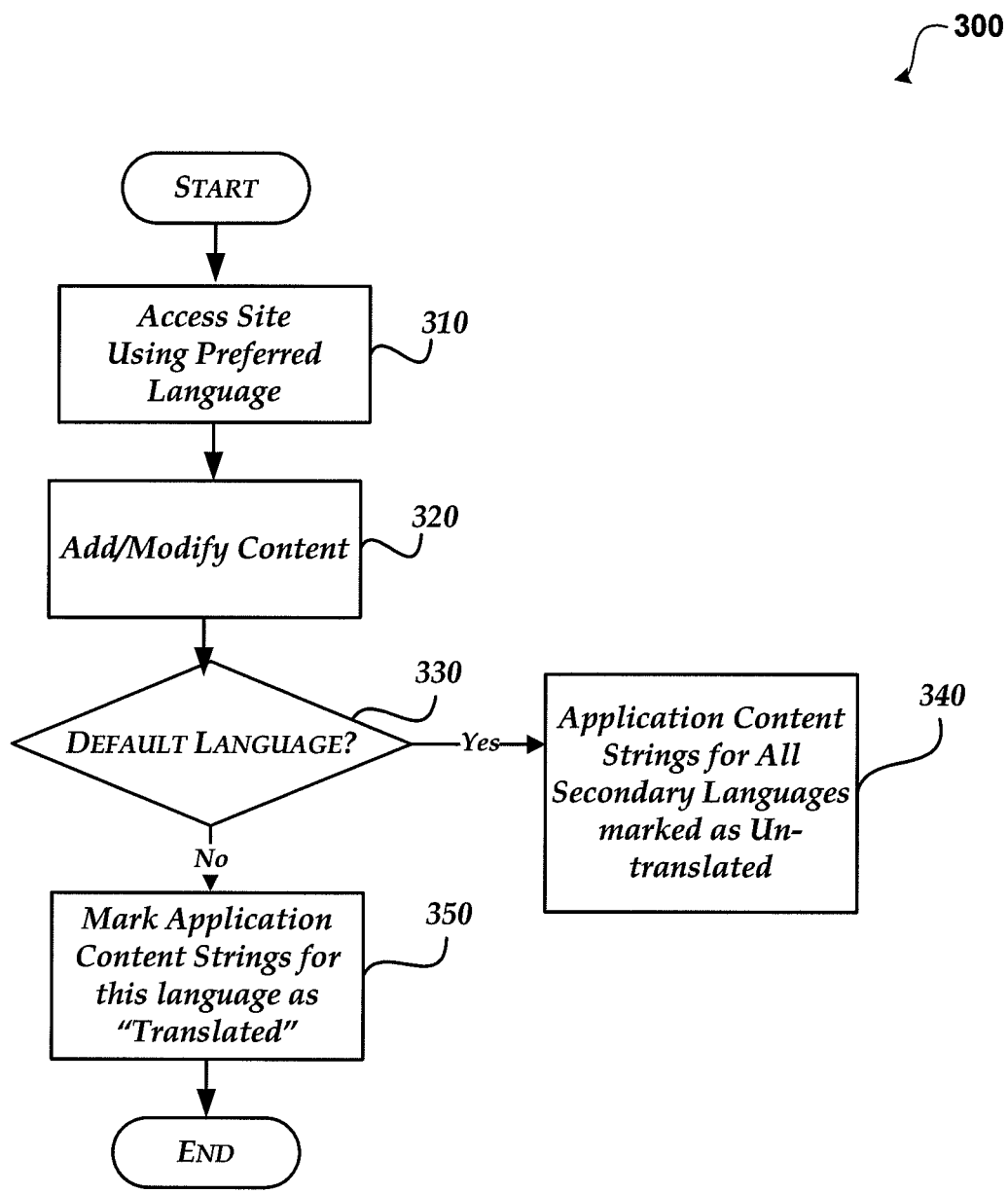
FIG. 3 illustrates a process for translating sites after provisioning.

Referring now to FIG. 3, an illustrative process for translating sites after provisioning is described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process 300 flows to operation 310 where a user accesses a site. For example, the user may navigate to a site that provides collaboration tools for team members working on a project. The site may be accessed by the user in a default language or in any of the other supported alternate languages.

Moving to operation 320, the user decides to modify content that is associated with the site. For example, the user may decide to add new application content to the site or modify existing application content of the site. For example, the user may decide to modify a description of a title of a column, a title of a documents folder, a description of a button and/or add a column, list, document folder and the like that is associated with the site.

Flowing to decision operation 330, a determination is made as to whether the user is making the change using the default language of the site or if the user is using an alternate language that is supported by the site to make the modification. Generally, any modification that is made in the default language is considered a change to the site that affects the translation of the corresponding strings in the alternate supported languages whereas any modification in one of the alternate languages is considered a translation of the string.

When the user is making the change(s) using the default language, then the process flows to operation 340 where any strings that are associated with the content change are marked as un-translated. For example, if a user makes a change to a title in the default language, then the alternate language strings representing the translation of the title are marked as un-translated indicating that those strings need to be translated into the alternate language.

When the user makes the change to the content using one of the alternate languages then the changed string is marked as translated indicating that the string has been translated for the alternate language. In this case, the strings representing the underlying default language string remain un-translated.

The process then flows to an end operation and returns to processing other actions.

Figure 4:
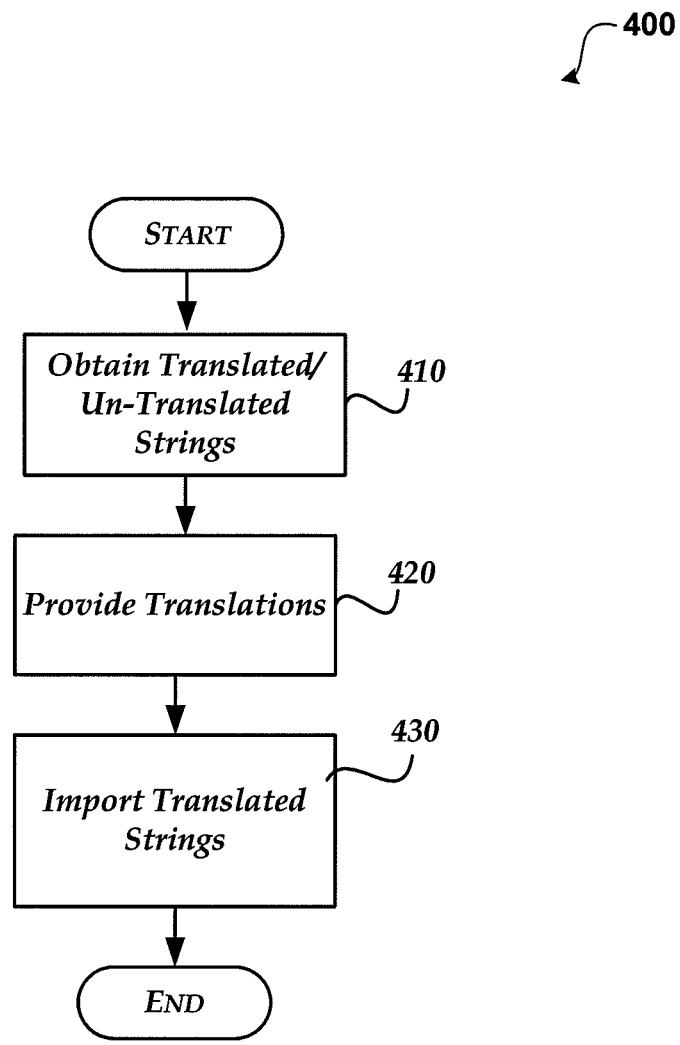
FIG. 4 shows a process for exporting/importing strings into a site.

FIG. 4 shows a process for exporting/importing strings into a site.

After a start operation, process 400 flows to operation 410 where the strings marked as translated/un-translated are obtained. The strings may be obtained programmatically using an API and/or obtained manually. For example, a user may access a file containing the strings and/or query the site to obtain a list of the strings. Other methods may also be used.

Moving to operation 420, translations of the strings are provided. The translations may be obtained many different ways. For example, the strings could be sent to a translation service to be localized to the supported alternate languages or the user could provide the translations by changing the strings within the export file.

Flowing to operation 430, the user imports the translated strings into the site. As with the exporting of the strings, the importing may be performed manually or programmatically. For example, the user could replace the appropriate file(s) or the user could use an API to insert the translations into the correct location for the site.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing a translation of a site after provisioning, comprising:
   accessing a site that is supported by a server from a client;
      wherein the site is initially provisioned using a default language; wherein the site supports viewing of content in an alternate language that is different from the default language after the site is provisioned; wherein the content includes application content and user content; wherein the application content is content that is associated with site software of the site that is used to provide a user interface that is associated with the site and the user content is content uploaded to the site that is not related to the user interface of the site and includes documents uploaded to a document library and titles of the document; wherein the application content includes strings to describe controls of the user interface;
   displaying the application content of the site using the default language;
   displaying the user content of the site in a language in which the user content is initially uploaded;
   receiving from the user interface a selection that indicates to display the site using the alternate language;
   translating the site from the default language to the alternate language without translating any of the user content; wherein translating the site includes changing the strings of the user interface of the site from the default language to the alternate language; and
   changing the display of the site from the default language to a display of the site using the alternate language.

2. The method of claim 1, further comprising determining when the application content associated with the site is modified and maintaining an identifier for the changed application content indicating whether the application content is translated and when the application content is un-translated.

3. The method of claim 2, wherein maintaining the identifier for the changed application content includes maintaining a separate identifier for each of the strings that are associated with the user interface for the site.

4. The method of claim 2, wherein determining when the content is modified comprises determining when the modification is made in the default language and when the modification is made in the alternate language and updating the identifier for the modified content depending on what language was used to make the modification.

5. The method of claim 4, further comprising setting the identifier for the changed content as translated when the change is made using the alternate language.

6. The method of claim 5, further comprising displaying a warning in the alternate language when the modification to the application content is an addition to the application content using the default language and marking the application content to un-translated when the addition to the application content is made using the default language.

7. The method of claim 4, further comprising setting the identifier for the changed content as un-translated when the change is made in the default language.

8. The method of claim 4, further comprising exporting each string in the application content that is identified as un-translated to a file for translation.

9. The method of claim 8, further comprising importing translated strings into the site and identifying the replaced strings in the site as translated.

10. A computer-readable storage medium, excluding a signal, having computer-executable instructions for providing a translation of a site after provisioning; comprising:
   providing a site that supports a group of users that access the site using a language that is selected from a default language and an alternate language; wherein the site is initially provisioned using the default language; wherein the site includes content that comprises application content and user content that is displayed according to an upload language;
   wherein the application content includes strings that identify functionality of a user interface that is associated with the site and wherein all of the user content including documents and titles of the documents is not translated to a different language from the upload language;

displaying the application content of the site using a selected language from the default language and the alternate language;

receiving from the user interface a selection that indicates to display the site using the non-selected language; and changing the display of the site from the selected language to the non-selected language by substituting the displayed application content translated with the translated application content in non-selected language.

11. The computer-readable storage medium of claim 10, further comprising determining when the application content associated with the site is modified; determining the language used to modify the content; and setting an identifier for the changed application content indicating whether the application content is translated and when the application content is un-translated.

12. The computer-readable storage medium of claim 11, wherein setting the identifier for the changed application content includes setting an identifier for strings that are associated with the changed application content.

13. The computer-readable storage medium of claim 11, wherein setting the identifier comprising setting the identifier to un-translated when the modification is made using the default language and setting the identifier as translated when the modification is made using the alternate language.

14. The computer-readable storage medium of claim 13, further comprising exporting un-translated application content to a file for translation.

15. The computer-readable storage medium of claim 14, further comprising importing translated application content into the site and identifying the associated strings in the site as translated.

16. A system for providing a translation of a site after provisioning; comprising:
a client computing device comprising a display; a processor a memory and a computer-readable medium; an operating environment stored on the computer-readable medium and executing on the processor; a network connection coupled to a network and a browser application;
a server computing device that comprises:
  a processor a memory and a computer-readable medium;
  an operating environment stored on the computer-readable medium and executing on the processor;
  a data source that is configured to store content including application content and user content; wherein the application content includes strings that identify functionality of a user interface that is associated with the site and wherein the user content is not ever translated and is always displayed according to an upload language;
a application that is configured to:
  provide a site that supports a group of users that access the site using a language that is selected from a default language and an alternate language; wherein the site is initially provisioned using the default language; wherein the site includes content that comprises application content and user content including documents and titles of the documents that is not translated;
  provide content to the client to display the application content of the site using a selected language from the default language and the alternate language;
  receive from the user interface on the client a selection that indicates to display the site using the non-selected language;
  provide updated content to the client to change the display of the site from the selected language to the non-selected language by substituting the displayed application content translated with the translated application content in non-selected language;
  determine when the application content associated with the site is modified and what language was used to make the modification;
  set an identifier for the changed application content indicating whether the application content is translated or whether the application content is un-translated; wherein setting the identifier comprising setting the identifier to un-translated when the modification is made using the default language and setting the identifier as translated when the modification is made using the alternate language.

17. The system of claim 16, further comprising exporting un-translated application content to a file for translation and importing the translated application content into the application content for the site.

* * * * *